(12) United States Patent
Quinn (10) Patent No.: US 6,549,204 B1
(45) Date of Patent: Apr. 15, 2003

(54) INTELLIGENT MODEL LIBRARY FOR A GRAPHIC IMAGE PROCESSING SYSTEM

(75) Inventor: Edward W. Quinn, Uniontown, OH (US)

(73) Assignee: Lockheed Martin Corporation, Akron, OH (US)

( * ) Notice: Subject to any disclaimer, the term of this patent is extended or adjusted under 35 U.S.C. 154(b) by 269 days.

(21) Appl. No.: 09/707,479

(22) Filed: Nov. 7, 2000

(51) Int. Cl.[7] ............................................. G06T 15/00
(52) U.S. Cl. ..................................................... 345/428
(58) Field of Search ................................ 345/419, 420, 345/423–428, 581

(56) References Cited

U.S. PATENT DOCUMENTS 6,426,750 B1 * 7/2002 Hoppe ......................... 345/428

* cited by examiner

*Primary Examiner*—Almis R. Jankus
(74) *Attorney, Agent, or Firm*—Renner, Kenner, Grieve, Bobak, Taylor & Weber (57) ABSTRACT

A method of enhancing the appearance of predetermined objects in a graphic display, rendered by a computing engine, includes a step of determining the system limitations of the computing engine for displaying an object in the form of a group of pixels, wherein the group of pixels distorts representation of the object at a distant range within the graphic display. The method also includes the steps of constructing a base model of the object viewable at a normal range within the graphic display, constructing at least one enhanced model of the object to provide a first set of attributes to the group of pixels to compensate for the distortions of the object at the distant range within the graphic display, and storing the base model and at least one enhanced model in an image database. These "intelligent models" are then used in a simulation program.

13 Claims, 4 Drawing Sheets

INTELLIGENT MODEL LIBRARY FOR A GRAPHIC IMAGE PROCESSING SYSTEM

TECHNICAL FIELD

The present invention relates to graphic image generation. In particular, the present invention relates to the generation of models for use in training simulators and the like. More specifically, the present invention relates to the generation of graphic images in which certain objects, whose area is a small percentage of the total image and yet of critical importance to the utility of the interactive graphic task being performed, are generated prior to use in the simulator and are provided with enhanced features to accurately represent the object.

BACKGROUND ART

High quality graphic image generation is used in various fields such as flight simulators, medical training and surgery, computer games, and engineering workstations, to name a few. It is imperative that these systems provide realistic images for the benefit of the user. These images should have as a minimum sufficient quality to correspond to the visual scene experienced by the user in viewing the objects directly with either optically aided or non-aided vision. The overall objective is to facilitate the teaching or game playing environment for the benefit of the user. The system goal therefore is to provide an immersive environment which is perceived by the user to be very like the visual appearance of the task as it would be performed in the real world.

The versatility of computers and emerging graphics display technology has led to the development of computer based training in which a range of tasks are presented through the visual medium. As may be expected, the closer the graphics are to those encountered in real situations, the higher the confidence level of the student and instructor in the value of the training conducted.

The generation of a graphic image by a computer relies on the existence of a model representation of the object which is being imaged. This model precisely defines the geometric and visualization properties of the object for graphic presentation. Depending on the view which is desired, the visualization process transforms the inherently 3-Dimensional representation into a two dimensional object. Appearance of the representation mimics that of the actual object as though it were being viewed through a virtual "window" whose position corresponds to that of the display medium.

The display medium itself presents limitations on the display of objects. The standard method of rendering an object is to transform it into a series of discrete picture elements ("pixels") which constitute the image of the object. Since these pixels have a very well defined and static size on the display, they impose a limit on the accuracy and detail of the image. This represents a distortion of the objects' model and detracts from the realism of the display. The standard industry answer to this problem has been a continuing effort to decrease the size of the pixels so as to improve realism.

A second problem encountered is that the complexity of the visual scene may lead to poor performance by the graphics system. This either reduces the allowable richness of the visual environment—to maintain realistic performance—or causes the expense associated with graphics hardware to rise, to allow performance expectations to be met. The increasing speed of graphics chips is steadily driving the price of graphics systems down and enlarging the scope of applications which can be handled by training systems.

The limitations of the display constitute the problem to be addressed. The following kinds of problems are present in known displays:

1. Aliasing: The image appears to be composed of "blocks" of a given size. Lines appear to be staircases, circles have sawtooth boundaries, etc.
2. Shape Distortion: The finite size of the pixels causes small objects to be represented by single pixels in which the aspect of the object cannot be determined.
3. Accuracy: The intensity of the object is not correctly computed and the object flickers due to random sub-sampling of the small object as successive frames are computed.
4. Special Effects: A lack of cues that the user may specifically rely on to assist in identifying or tracking the motion of an object. For example, sun glint from a windshield canopy.

A basic assumption is that only certain, very specific objects need to be rendered with high accuracy and detail. If an attempt were made to render the entire scene with additional accuracy, the graphic processor would be swamped with the requirement and the potential advantages of an improved rendering would not be available.

To this end, it is desired to provide systems which do not create false impressions with unrealistic or inaccurate object representations. For example, flight simulators are employed to train fighter pilots on how to quickly detect objects such as enemy planes and missiles. The pilot does this by scanning the horizon in a predetermined pattern along with other visual and auditory warnings. As such, if the flight simulator renders an object with a fluttering appearance or an unrealistic large size, a false impression of the target is generated. As such, the training exercise is detrimental in that the actual appearance of an enemy plane or target is unrealistic. Hence the visual expectations of the pilot in air combat become unrealistic and life threatening. Similar limitations exist for medical training and surgery preparation/execution and other similar applications. Hence accepted practice is to overcome this very serious limitation by resorting to alternate—and generally more expensive—means of accomplishing the objective. As an example, after training in a simulator, the pilot must spend a large number of hours in the aircraft to become familiarized with the appearance of aircraft and missiles in the real world.

Attempts at improving graphic image processors used with simulators and other interactive graphics devices continue due to the desire to improve the quality of displays. These are limited by the pace of advancements in computer and display technology.

In general, it is known to apply improved rendering techniques to an entire image display to enhance the overall appearance of the images presented. However, this approach rapidly consumes processing power available and accordingly, limits other operational aspects of the image processor such as real-time presentation of the total visual environment. Moreover, current technology graphic processors using embedded graphic algorithms are unable to selectively improve the visual appearance of those items whose detail is particularly important and critical to the overall success of the training simulation. This is exemplified by the aforementioned planes and missiles that require high acuity presentation in order to assure that the pilot is being trained in an environment as similar as possible to the visual environment likely to be encountered in actual air combat.

The present processing equipment does not prioritize these objects and accordingly, processes the important items as it would any background information. This limits the usefulness of the training or display environment.

One alternative to the aforementioned approach is to employ high acuity projectors in conjunction with a graphic image processor. This technique generates a simulated background scene and superimposes the critical images onto the scene with a higher resolution. This requires additional processing equipment and is quite expensive. Moreover, the high resolution projectors of today are unable to represent the critical objects with the acuity and real world appearance necessary for effective training or practice.

An extension of this approach is to provide a hardware-based solution utilizing high resolution Area of Interest displays. In conjunction with this, a mechanism is provided for tracking pilot head position and those areas where the pilot is perceived to be looking are processed with high resolution. Unfortunately, this method employs unrealistic background scenes which appear artificial and do not present an accurate representation for a training simulator. Hence the lower detail background image appears to the pilot undergoing training to be quite different than the remainder of the visual scene. This provides the pilot with a visual cue not available in air combat and lessens the pilot's ability to perform air combat maneuvers effectively.

The current preferred system for generating graphic images for simulators is to provide an image database that is accessed by a graphic computing engine. Depending upon input from the trainee, images are rendered to a memory buffer and then displayed at about 60 frames per second. One enhancement to this current technology is to render the critical objects, such as enemy airplanes, in a separate memory buffer which is then transferred to the main memory buffer for display. Although an improvement, a high resolution display of about 5,000×4,000 pixel screen density is required to properly display the critical objects. This approach is still quite costly as it still requires the use of laser projectors which are not currently available and whose cost is likely to be very prohibitive upon the initial introduction of this improved technology.

One alternative to the foregoing systems is disclosed in U.S. patent application Ser. No. 09/257,452 entitled "Variable Acuity Rendering for a Graphic Image Processing System" filed on Feb. 25, 1999, which is incorporated herein by reference. This patent application provides for the recognition of predetermined critical objects in a graphic display. The graphic image scene is enhanced by storing a plurality of object descriptions which are segmented into critical objects and background objects in an image database. The critical objects and the background objects are transferred to a computing engine which renders the critical objects and the background objects according to expert user recommendations. The critical objects are rendered separately with acuity enhancements to generate enhanced critical objects that greatly improve the realistic impression of the objects in simulators. The background objects and the enhanced critical objects are then transferred into a memory buffer as a graphic image which is then displayed at a single resolution. Although the forgoing system is an improvement in the art, it does require additional computer processing capability in order to accommodate the critical objects with high acuity.

Based upon the foregoing, it is evident that there is a need for a graphic image processor system which displays critical objects from an intelligent module library while using available graphics processing power to display the entire scene at the same resolution. The availability of this capability markedly improves human performance in real world visual tasks for which extensive training is currently the norm.

DISCLOSURE OF INVENTION

In light of the foregoing, it is a first aspect of the present invention to provide a method for generating an intelligent model library for a graphic imaging system, wherein an image is generated by a method of enhancing recognition of predetermined objects in a graphic display rendered by a computing engine.

Another aspect of the present invention is to provide the system and method, as set forth above, which includes a method step of determining processing system limitations such as the type of display system utilized, the type of image generator utilized, the object to be modeled, the expertise of the trainee, and the various types of backgrounds in which the object model will be displayed. This analysis is used to determine what affect, if any, the system limitations may have on the appearance of the picture elements or pixels that make up the critical object.

Still a further aspect of the present invention is to provide the system and method, as set forth above, wherein a model is selected as a critical object, wherein the model is constructed as a series of wire-framed polygons with specific attributes assigned to each polygon. As a result, the final object appears as an accurate representation of the actual object at a relatively close range.

Yet another aspect of the present invention is to provide the system and method, as set forth above, which includes a method for generation of an intelligent model library for use with a simulator, wherein the model is enhanced for various attributes of size, shape, and contrast, to name a few, so as to improve the acuity of the model when represented in a display at different distances.

Still another aspect of the present invention is to provide the system and method, as set forth above, which includes a method for generating an intelligent model library for use with a simulator, wherein the enhanced model is tested in very different scenarios to obtain an optimum desired enhancement of the base model.

A further aspect of the present invention is to provide the system and method, as set forth above, which includes a method for generating an intelligent model library for use with a simulator, in which the enhanced models are stored in an image database.

Still yet another aspect of the present invention is to provide a method for generating an intelligent model library for use with a simulator, as above, wherein the stored models are exported to a simulator program for use in a simulation.

Still an additional aspect of the present invention is to provide a method for generating an intelligent model library for use with a simulator, as above, wherein the enhanced models are adjusted to facilitate the trainee's level of expertise.

The foregoing and other objects of the present invention, which shall become apparent as the detailed description proceeds, are achieved by a method for enhancing the appearance of predetermined objects in a graphic display, rendered by a computing engine, comprising determining system limitations of the computing engine for displaying an object in the form of a group of pixels, wherein the group of pixels distort representation of the object at a distant range within the graphic display; constructing a base model of the object viewable at a normal range within the graphic display; constructing at least one enhanced model of the object to provide a first set of attributes to the group of pixels to compensate for the distortions of the object at the distant range within the graphic display; and storing the base model and at least one enhanced model in an image database.

Other objects of the present invention are attained by a computer-readable medium having stored thereon a data structure, comprising a first field containing data representing a base model viewable at a normal range within a graphic display; and at least a second field containing data representing the base model viewable at a second range other than the normal range within the graphic display, the second field having a set of attributes represented by a group of pixels to compensate for any distortion of the base model at the second range.

These and other objects of the present invention, as well as the advantages thereof over existing prior art forms, which will become apparent from the description to follow, are accomplished by the improvements hereinafter described and claimed.

BRIEF DESCRIPTION OF THE DRAWINGS

For a complete understanding of the objects, techniques and structure of the invention, reference should be made to the following detailed description and accompanying drawings, wherein.

BEST MODE FOR CARRYING OUT THE INVENTION

Figure 1:
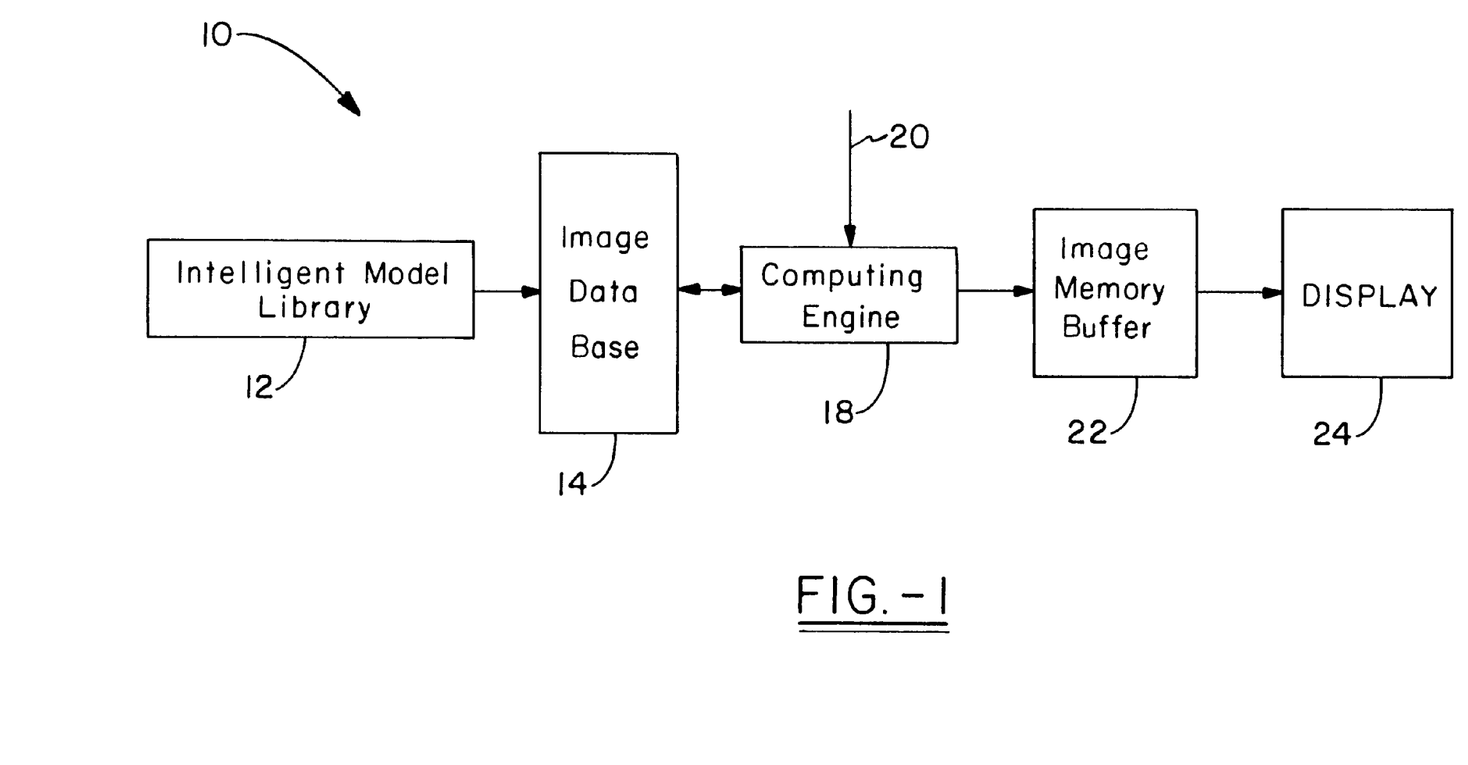
FIG. 1 is a schematic block diagram showing use of an intelligent model library.

Referring now to the drawings, and in particular, to FIG. 1, it can be seen that a graphic image processing system for enhancing recognition of predetermined objects in a graphic display rendered by a computing engine, according to the present invention, is designated generally by the numeral 10. Generally, the system 10 provides a computer processing system specifically designed for displaying graphic images. An example of such a system is the Silicon Graphics Infinite Reality Engine. The system 10 includes the necessary hardware, software, and memory required for operation of high-end graphic processing systems that are used in computer games, personal computers, medical training simulators, engineering graphic work stations, flight simulators, and the like. Accordingly, the system 10, and portions thereof, is implemented via a computer-readable media such as RAM or ROM and distribution media such as floppy disks, CD-ROMs, hard disks, and the like. In the present instance, the system 10 is configured to visually generate objects of critical importance to a simulation or any object in a scene that requires enhanced acuity to allow the user to be trained effectively.

The system 10 includes an intelligent model library 12. As will be described in further detail below, the library 12 includes representations of an object which must be rendered with high acuity in the system 10. Suffice it to say that the overall concept or purpose of the library 12 is to modify the model of a critical object such that its apparent size begins to approach the limitations imposed by the pixels comprising the display and to ensure that the overall accuracy of the representation is maintained as much as possible. The final desired result is that the intelligent model library provides variations of a base model, depending upon the position of the model within the graphic display. For example, if the object being represented by the model is fully displayed on the display, its detail remains essentially unchanged. In the event that the model is off in the distance and represented by a minimal number of pixels on the display, certain features of the model are adjusted so that it is accurately represented so as not to distort the training process. Once all of the models are loaded into the intelligent model library 12, the models are then exported into an image database 14. It will be appreciated that the models are contained in the form of digital descriptive data for features such as the object's shape, color, reflective characteristics, texture type, overlain texture imagery, and other scene descriptive data. Moreover, these models consist of polygonal boundaries such as triangular or rectangular lines or other similar geometric shapes. These shapes are then linked together in a graphic data structure. In addition to containing or receiving the models, the image database 14 includes other items that make up the entire display. This includes, but is not limited to, rivers, roads, cities, clouds, sky conditions, and other aspects of the scene adequately rendered by a known graphic image processing system.

A computing engine 18 accesses the image database 14 to generate the pictorial information for later viewing. To implement this, an application engineer receives expert user or other input to properly define the objects contained in the image database 14. In a flight simulator, or any other type of simulator, a pilot or user controls a joystick and has control over other elements within the simulator environment. Pilot or user action and other outside contributions to the display appearance are identified as input 20. Control of these elements is input to the computing engine 18 and directly affects how the models and other images are presented in the rendered image. The computing engine 20 retrieves the images and models and utilizes a rendering system that sequentially steps through each of the polygon object elements and accurately represents their appearance at a moment in time. The engine 18 then transfers these polygons, as represented by any number of pixels, to an image memory buffer 22. The image memory buffer 22 renders a single frame of the image while rendering subsequent frames of the image in a real time scenario. A single frame of the image memory buffer 22 is then transferred to a display 24 at a desired resolution.

The sequential rendering of all of the objects, the models and background scene information, is then repeated. In other words, when a next picture, which may be slightly different due to changes in the scene content is complete, it is transferred to the display 24 at a rate of about 60 frames per second. The scene content changes can be caused by a change in the position of the pilot's eye point from which the objects are being viewed, changes in the object positions themselves, changes in environmental conditions such as sun position or other similar changes as provided by the input 20. A generation of the sequence of pictures correspond to a real time sequence similar to that of a motion picture. Accordingly, the scene displayed by the display 24 appears to be a continuous view of the objects as from the pilot's eye point.

As will be appreciated from the description of the operation of the system 10, the rendering of a critical object identified in the intelligent model library 12, is of the utmost importance.

Figure 2:
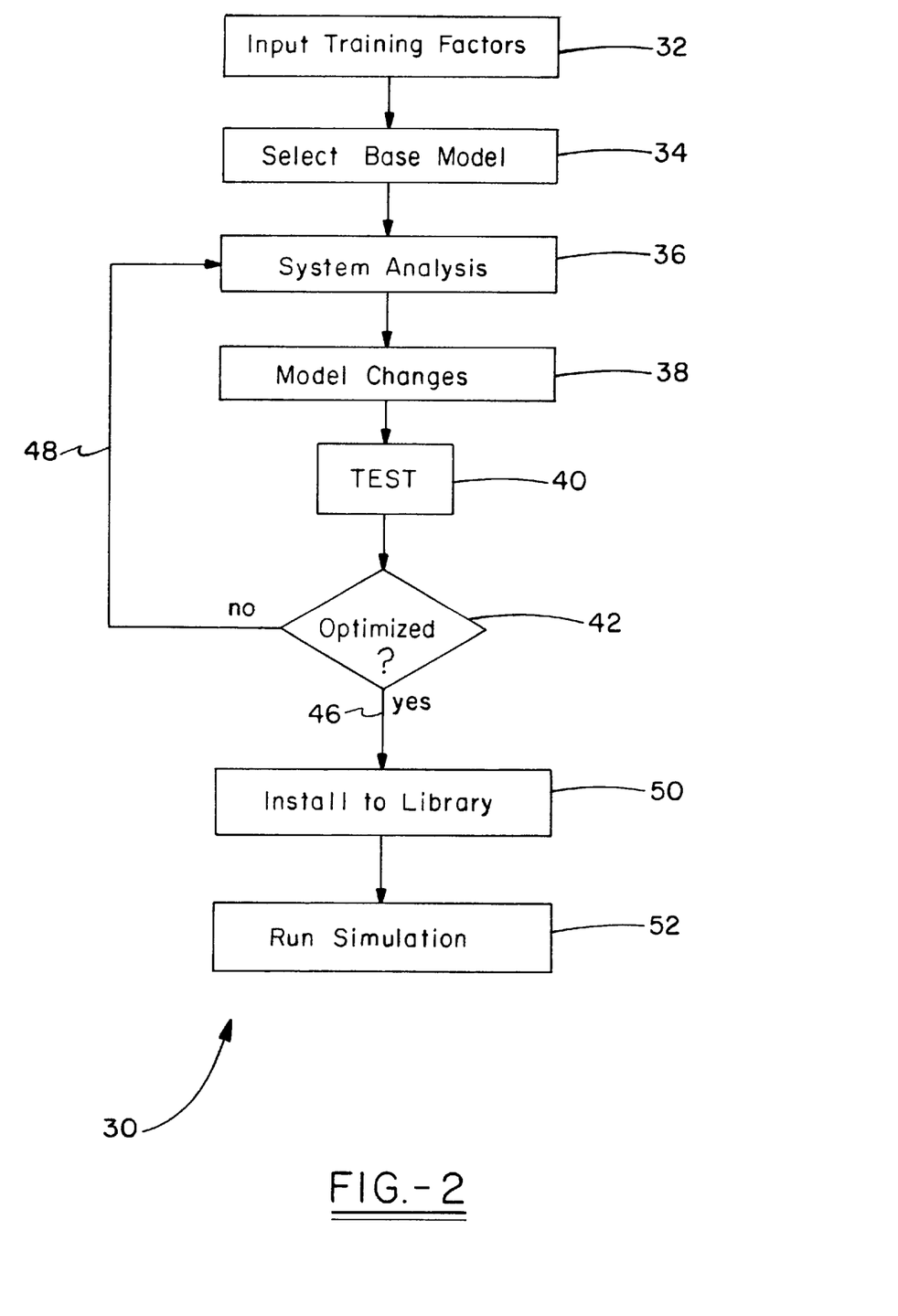
FIG. 2 is a flow chart showing a method for generation of the intelligent model library.

Referring now to FIG. 2, it can be seen that a method for constructing intelligent models is designated generally by the numeral 30. The generation of the intelligent models is done to improve the training of pilots or researchers for target detection, aspect determination, recognition, and identification. The method is designed to be controlled as a function of various factors including, but not limited to: the type of graphic display system utilized; the type of image generator utilized; the type of model, F16, F15E, SCUD missile, or any other object which is of critical importance to the flight simulation scenario; the expertise of the trainee; and weather conditions in the scene. The intelligent model library 12, that is all of the models contained within the library, are modified to enhance the presentation of the objects using the current display system total modulation transfer function. Accordingly, it is desired to overcome the limitations of the display minimum resolution by increasing the contrast of objects. For example, the sharpness or clarity of the object can be improved by increasing the color difference between the object and the background or increasing the object size artificially as a function of range. As an object gets further downrange and changes its aspect ratio, the pixels may begin to flutter, which causes the object to be more readily apparent and mislead the trainee into thinking that an object does this in actuality. Other limitations are overcome by increasing the size of the individual components of the object to achieve a result similar to anti-aliasing. By overcoming the aforementioned limitations of the display of minimum resolution, the training of a novice is improved. Moreover, trained and expert pilots may be further trained by incorporating the model into either less or more difficult situations by utilizing size modification. These objectives also allow for the practice of extreme weather conditions in which the visibility of a target may vary dramatically depending upon the background scene information and other factors.

As a first step of the method 30, step 32 requires the input of training factors as noted above. These training factors include, but are not limited to, the display system, the image generator, the model to be enhanced, expertise of the trainee, and background scene information likely to be encountered with use of the model. At step 34, the model is selected for enhancement. As used in the present scenario, the attention of the reader is directed to FIG. 3 which shows a model 60 with its intended features that are readily apparent in an image display at a relatively close range. In practice, the base model 60 is used for display when the model is in a range of zero feet to half a mile. By examining FIGS. 3A–C, it is easy to see that each of the views is strikingly different geometrically. In training a pilot to recognize the relative geometric aspect of an aircraft visually, these views distinguish an aircraft flying a parallel course (either horizontally or vertically) from a course leading away from the pilot's position. Other views of the aircraft would allow the pilot to distinguish other probable relative motion characteristics as well as likely changes in an aircraft's path.

At step 36, the method 30 utilizes a system analysis to determine the distance at which it is anticipated that the base model of the object begins to be strongly affected by pixel limitations. The size of the model or critical object dictates the range at which this begins to occur. In other words, at what point does the representation of the model, in the form of a group of pixels, begin to distort the appearance of the model in the display? For example, as a model is viewed downrange, if its representation by a certain aspect of a group of pixels is inaccurate, it can mislead the person being trained. At step 38, various kinds of model changes to the critical object are postulated to enhance its appearance and overcome the pixel limitations of the display. These model changes can include such things as object size or object shape. For example, the object may be made larger to prevent smallness from rendering it invisible on the display. In regard to object shape, certain features of the object may be lengthened to exaggerate the aspect cue of the object. Other features which may be modified are the object color such that for an enlarged model, the color might be whitened to preserve the overall contrast with the background scene information. The internal object geometry may also be modified to highlight reflections such as sun glint generated by a canopy of an aircraft.

Figures 3A, 3B, 3C:
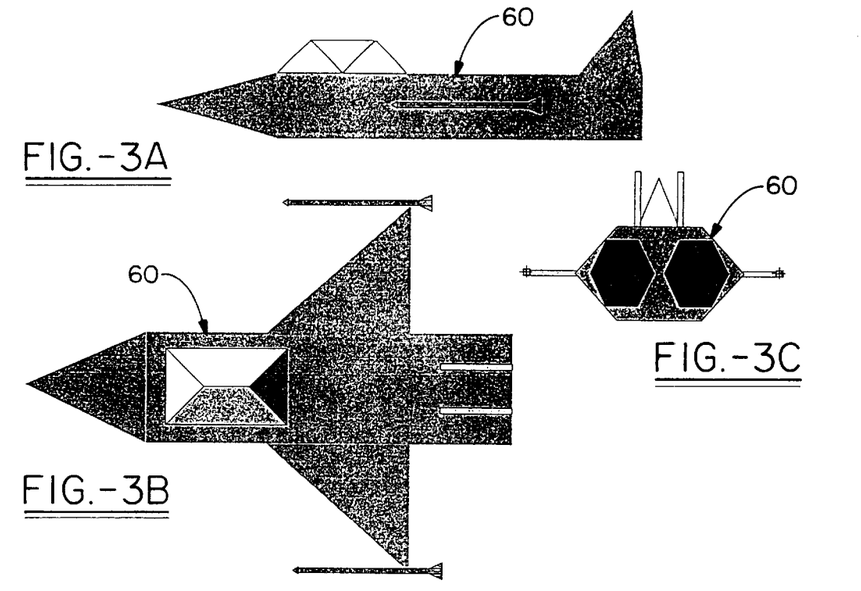
FIGS. 3A–C are side, top, and rear elevational views of a three-dimensional model.

FIG. 4 shows an enhanced model 62 to illustrate the exact same model as shown in FIGS. 3A–C, but with the appearance of the model artificially darkened relative to the actual color of the aircraft. This representation would be used when the model is being viewed at far range against a generally light background. The purpose of the darkening is to compensate for the effect of a computer graphics system displaying a model in which the model only subtends a small number of screen pixels. A standard characteristic of a computer graphics system as it begins to display objects at its resolution limit is that the contrast of the object begins to be reduced. This factor effectively further reduces the resolution capability of the system. The effect can be calculated and is known in the industry as the "Kell Factor."

For a specific graphic system and for a specific model, the effect of the Kell factor can be calculated. Given knowledge of the background in which the model will be generally placed, the degree of contrast reduction can be overcome by changing the color of the object appropriately. It is the change in coloration to allow the effective resolution of the display system to be increased which is illustrated.

It will be appreciated that the enhanced models use a smaller number of polygons. This saves processing time inasmuch as the less critical, fine details of the object do not affect the appearance of the model when downrange. With these enhanced models, the method undergoes a test step 40 to determine how the models appear in an actual simulation. At step 42, it is determined whether the model and enhanced models are accurate representations at given distances and ranges within simulator display. If not, at step 48, the method is returned to the system analysis step 36 for further evaluation at steps 38 and 40. However, if it is determined that the models are optimized, the models are then transferred to the intelligent model library at step 50. The next step, of course, is to run a simulation 52 with the trainee.

Included in the step 38 of changing the models, it will be appreciated that the models can be configured to assist in the training of novices by enlarging the size of the models. This would begin the training process for novices by allowing them to recognize critical objects without much difficulty. The models may then be configured to be yet smaller configurations so as to enhance the training process.

FIGS. 3–5 illustrate but a subset of the possible library modifications to provide a model which increases the value of the training a student may receive through the use of a computer graphic system. As a function of the training requirement and visual aspects required to effectuate it, the intelligent model library design process must proceed to utilize available modeling tools effectively to overcome computer graphic display system limitations.

Figures 4A, 4B, 4C:
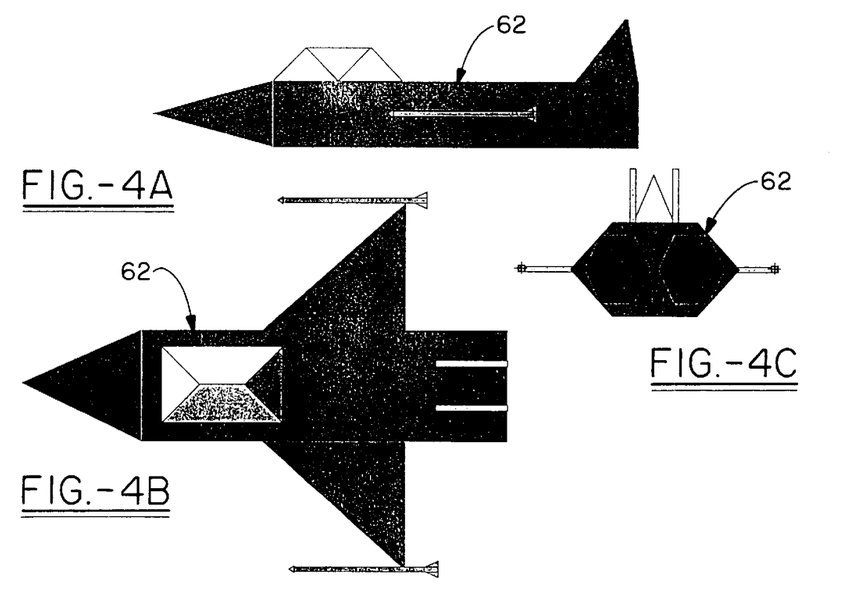
FIGS. 4A–C are side, top, and rear elevational views of an enhanced three-dimensional model derived from the base model shown FIG. 3.
Figures 5A, 5B, 5C:
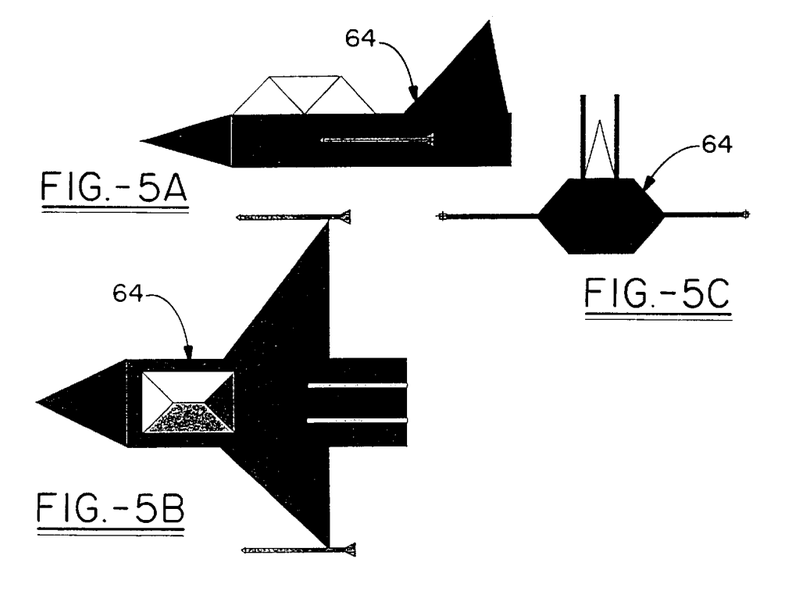
FIGS. 5A–C are side, top, and rear elevational views of a further enhanced threedimensional models derived from the base model shown FIGS. 3 and 4.

FIGS. 5A–C illustrate another technique for the intelligent model library approach. In this technique, a model 64 is displayed at even a farther range than in FIGS. 4A–C. Hence, the number of pixels being displayed is even smaller. Since the effect of Kell Factor increases contrast reduction as object size decreases, the shading of the aircraft model is further reduced to compensate. However, an additional effect has been added. Since the number of pixels is now too small to allow the graphic system to render an image which portrays the geometric relationships allowing the pilot to perceive aircraft attitude, the geometry of critical elements of the aircraft have been changed. In this case, the wing and tail sections are larger than in actuality. This allows them to subtend a slightly larger number of pixels so that the pilot can continue to receive visual cues in a manner similar to the real-world. In order to keep the overall size of the aircraft constant, the remainder of the aircraft body is reduced proportionately.

Figure 6:
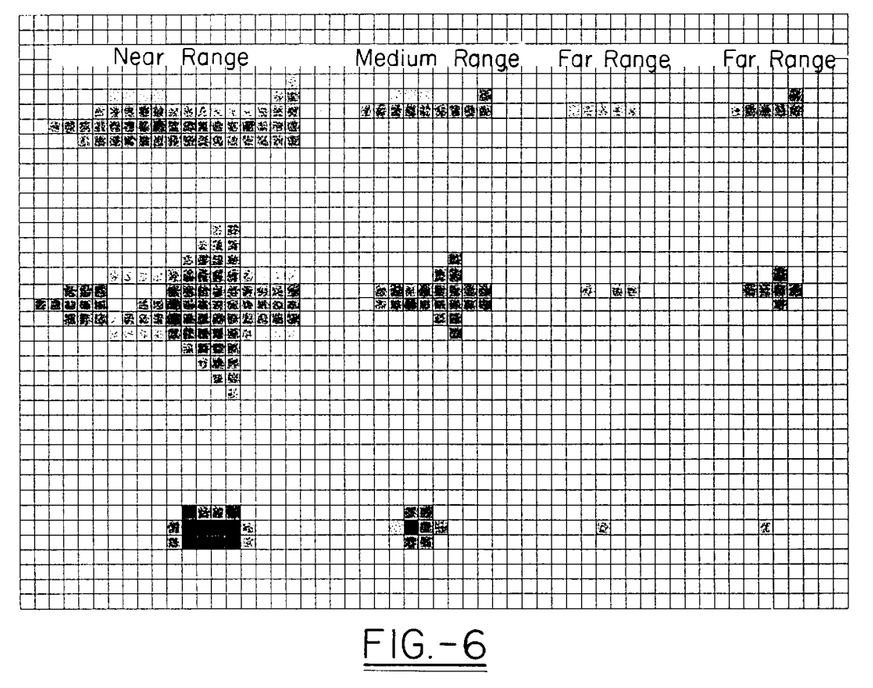
FIG. 6 shows various pixel segmentation screen representations of the models shown in FIGS. 3–5.

FIG. 6 illustrates the appearance of each of the models on the graphic system. The segmentation of the screen into pixels is indicated by a grid overlay.

At the left are the models represented by FIGS. 3A–C. Although the coarseness of the pixel grid significantly degrades the image, in each case, the general orientation of the aircraft can be distinguished.

Next, the appearance of the models characteristics by FIGS. 4A–C at medium range are portrayed. The model is now sufficiently small that without some degree of darkening relative to FIG. 3, the contrast would have been lost against the background. This would have significantly degraded visibility. However, with darkening, the perceived contrast to the eye is maintained.

Next, FIGS. 4A–C are again portrayed, but at twice again the range. The tail and wing sections are now too small to be captured by the pixel grid. This has seriously degraded the viewer's capability to identify the aircraft orientation. This effect is due to the pixel grid. It odes not correspond to the real-world appearance of the object.

Finally, FIGS. 5A–C are shown at the same range. The geometric exaggeration of FIGS. 5A–C have allowed the capability to distinguish general orientation to be maintained. In addition, the greater darkening has also maintained contrast.

Based upon the foregoing, the advantages of the present invention are readily apparent. By constructing the intelligent model library, the need to incorporate increased processing power for actual representation of the objects during real time is significantly reduced. By reducing the number of polygons in the enhanced models, the amount of computing time required to render these models is also significantly reduced. The intelligent model library is also easily implemented into existing systems and provides lifelike simulations for trainees in realistic training environments.

Thus, it can be seen that the objects of the invention have been obtained by the structure and methodology presented above. While in accordance with the Patent Statutes, only the best mode and preferred embodiment of the present invention has been presented and described in detail, it is to be understood that the invention is not limited thereto or thereby. Accordingly, for an appreciation of true scope and breadth of the invention, reference should be made to the following claims.

What is claimed is:

1. A method of enhancing the appearance of predetermined objects in a graphic display, rendered by a computing engine, comprising:

determining system limitations of the computing engine for displaying an object in the form of a group of pixels, wherein said group of pixels distort representation of said object at a distant range within the graphic display;

constructing a base model of said object viewable at a normal range within the graphic display;

constructing at least one enhanced model of said object to provide a first set of attributes to said group of pixels to compensate for the distortions of said objects at the distant range within the graphic display;

storing said base model and said at least one enhanced model in an image database; and constructing a second enhanced model of said object to provide another set of attributes to said group of pixels to compensate for the distortions at an intermediate range between said distant range and said normal range, wherein said set of attributes includes enlarging said group of pixels to prevent smallness from rendering said group of pixels unviewable on the graphic display.

2. A method for enhancing the appearance of predetermined objects in a graphic display, rendered by a computing engine, comprising:

determining system limitations of the computing engine for displaying an object in the form of a group of pixels, wherein said group of pixels distort representation of said object at a distant range within the graphic display;

constructing a base model of said object viewable at a normal range within the graphic display;

constructing at least one enhanced model of said object to provide a first set of attributes to said group of pixels to compensate for the distortions of said object at the distant range within the graphic display; and storing said base model and said at least one enhanced model in an image database, wherein said set of attributes includes enlarging said group of pixels to prevent smallness from rendering said group of pixels unviewable on the graphic display.

3. A method for enhancing the appearance of predetermined objects in a graphic display, rendered by a computing engine, comprising:

determining system limitations of the computing engine for displaying an object in the form of a group of pixels, wherein said group of pixels distort representation of said object at a distant range within the graphic display;

constructing a base model of said object viewable at a normal range within the graphic display;

constructing at least one enhanced model of said object to provide a first set of attributes to said group of pixels to compensate for the distortions of said object at the distant range within the graphic display; and storing said base model and said at least one enhanced model in an image database, wherein said set of attributes includes elongating portions of said group of pixels to lengthen said object to exaggerate its aspect cue.

4. A method for enhancing the appearance of predetermined objects in a graphic display, rendered by a computing engine, comprising:

determining system limitations of the computing engine for displaying an object in the form of a group of pixels, wherein said group of pixels distort representation of said object at a distant range within the graphic display;

constructing a base model of said object viewable at a normal range within the graphic display;

constructing at least one enhanced model of said object to provide a first set of attributes to said group of pixels to compensate for the distortions of said object at the distant range within the graphic display; and storing said base model and said at least one enhanced model in an image database, wherein said set of attributes includes altering the color of at least a portion of said group of pixels to adjust the contrast of said object within the graphic display.

5. A method for enhancing the appearance of predetermined objects in a graphic display, rendered by a computing engine, comprising:

determining system limitations of the computing engine for displaying an object in the form of a group of pixels, wherein said group of pixels distort representation of said object at a distant range within the graphic display;

constructing a base model of said object viewable at a normal range within the graphic display;

constructing at least one enhanced model of said object to provide a first set of attributes to said group of pixels to compensate for the distortions of said object at the distant range within the graphic display; and storing said base model and said at least one enhanced model in an image database, wherein said set of attributes includes altering the internal object geometry of at least a portion of said group of pixels to adjust the contrast of said object within the graphic display.

6. A method for enhancing the appearance of predetermined objects in a graphic display, rendered by a computing engine, comprising:

determining system limitations of the computing engine for displaying an object in the form of a group of pixels, wherein said group of pixels distort representation of said object at a distant range within the graphic display;

constructing a base model of said object viewable at a normal range within the graphic display;

constructing at least one enhanced model of said object to provide a first set of attributes to said group of pixels to compensate for the distortions of said object at the distant range within the graphic display;

storing said base model and said at least one enhanced model in an image database;

determining a training level of a person using images generated on said graphic display; and constructing said at least one enhanced model of said object according to said training level.

7. The method according to claim 6, further comprising:

storing said at least one enhanced model of said object with varied characteristics according to a corresponding number of said training levels.

8. A method for enhancing the appearance of predetermined objects in a graphic display, rendered by a computing engine, comprising:

determining system limitations of the computing engine for displaying an object in the form of a group of pixels, wherein said group of pixels distort representation of said object at a distant range within the graphic display;

constructing a base model of said object viewable at a normal range within the graphic display;

constructing at least one enhanced model of said object to provide a first set of attributes to said group of pixels to compensate for the distortions of said object at the distant range within the graphic display;

storing said base model and said at least one enhanced model in an image database; and exporting said base model and said at least one enhanced model into a simulation program run by the computing engine.

9. A computer-readable medium having stored thereon a data structure, comprising:

a first field containing data representing a base model viewable at a normal range within a graphic display; and at least a second field containing data representing said base model viewable at a second range other than said normal range within said graphic display, said second field having a set of attributes represented by a group of pixels to compensate for any distortion of said base model at said second range, wherein pixels in said group of pixels are altered with respect to their coloration in at least said second field.

10. The computer-readable medium according to claim 9, wherein said set of attributes are altered with respect to their size in at least said second field.

11. The computer-readable medium according to claim 10, wherein said set of attributes are altered by increasing a first portion of said set attributes or decreasing a second portion of said set of attributes or both.

12. A computer-readable medium having stored thereon a data structure, comprising:

a first field containing data representing a base model viewable at a normal range within a graphic display;

at least a second field containing data representing said base model viewable at a second range other than said normal range within said graphic display, said second field having a set of attributes represented by a group of pixels to compensate for any distortion of said base model at said second range; and a third field containing data representing said base model viewable at a third range other than said normal or second ranges within said graphic display, said third field having a third set of attributes represented by a third group of pixels to compensate for distortions of said base when viewed at said third range.

13. A computer-readable medium having stored thereon a data structure, comprising:

a first field containing data representing a base model viewable at a normal range within a graphic display; and at least a second field containing data representing said base model viewable at a second range other than said normal range within said graphic display, said second field having a set of attributes represented by a group of pixels to compensate for any distortion of said base model at said second range, wherein said first field contains data subsets representing different views of said base model, and wherein said second field contains data subsets representing different views of said base model at said second range.

* * * * *

UNITED STATES PATENT AND TRADEMARK OFFICE
CERTIFICATE OF CORRECTION

PATENT NO.   : 6,549,204 B1
DATED        : April 15, 2003
INVENTOR(S)  : Edward W. Quinn It is certified that error appears in the above-identified patent and that said Letters Patent is hereby corrected as shown below:

<u>Column 10,</u>
Line 2, the first occurrence of "of" should be deleted and the word -- for -- substituted therefor.
Line 13, the word "objects" should be deleted and the word -- object -- substituted therefor.

Signed and Sealed this

Nineteenth Day of August, 2003

JAMES E. ROGAN
*Director of the United States Patent and Trademark Office*